United States Patent
Higashide (10) Patent No.: US 8,849,280 B2
(45) Date of Patent: Sep. 30, 2014

(54) MOBILE TERMINAL DEVICE, ITS COMMUNICATION METHOD, AND RADIO NETWORK SYSTEM

(75) Inventor: Naoto Higashide, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 596 days.

(21) Appl. No.: 12/593,907

(22) PCT Filed: Mar. 31, 2008

(86) PCT No.: PCT/JP2008/056353
§ 371 (c)(1),
(2), (4) Date: Dec. 15, 2009

(87) PCT Pub. No.: WO2008/123501
PCT Pub. Date: Oct. 16, 2008

(65) Prior Publication Data
US 2010/0136976 A1    Jun. 3, 2010

(30) Foreign Application Priority Data
Mar. 29, 2007   (JP) ................................ 2007-087831

(51) Int. Cl.
H04W 4/00      (2009.01)
(Continued)

(52) U.S. Cl.
CPC .................................. *H04W 36/36* (2013.01);
(Continued)

(58) Field of Classification Search
USPC ........ 455/422.1, 434, 435.1–435.2, 436–439, 455/442–444, 450, 452.1–452.2, 458, 455/516–517, 524–525, 550.1, 552.1, 455/556.2, 560–561; 370/252–253, 370/328–332, 337–338, 341, 345, 347–350
See application file for complete search history.

(56) References Cited

U.S. PATENT DOCUMENTS

2002/0197992 A1* 12/2002 Nizri et al. .................... 455/435
2003/0032462 A1*  2/2003 Wang et al. ................... 455/574
(Continued)

FOREIGN PATENT DOCUMENTS

EP      1 006 746      6/2000
EP      1 655 908      5/2006
(Continued)

OTHER PUBLICATIONS

International Search Report for PCT/JP2008/056353, mailed Jul. 1, 2008, 2 pages.

*Primary Examiner* — Meless Zewdu
(74) *Attorney, Agent, or Firm* — Duane Morris LLP (57) ABSTRACT

Provided is a mobile terminal apparatus which can realize a long-time wait as follows. The mobile terminal apparatus surely performs a reselection process to increase chances to wait for a host communication system, improve the traffic efficiency, and reduce arrival failures while reducing power consumption. A communication method and a radio network system for the mobile terminal apparatus are also disclosed. The mobile terminal apparatus (mobile telephone 10) includes a communication unit (1) and a control unit (8). The control unit (8) uses the communication unit (1) to periodically monitor presence/absence of a predetermined bit of a paging channel in a base station with which communication is in progress. If the presence of the bit is confirmed, the control unit (8) changes the communication time slot so as to acquire broadcast information reported by the paging channel and extracts a parameter containing information which identifies a communication system existing in the periphery from the broadcast information. The control unit (8) executes a reselection process for releasing the session of the communication system which is currently waiting and executes a reselection process for a capture trial on the identified communication system.

10 Claims, 6 Drawing Sheets

(51) Int. Cl.
*H04W 36/00* (2009.01)
*H04W 72/00* (2009.01)
*H04B 7/00* (2006.01)
*H04W 36/36* (2009.01)
*H04W 36/14* (2009.01)
*H04W 48/18* (2009.01)
*H04W 52/02* (2009.01)
*H04W 48/10* (2009.01)

(52) U.S. Cl.
CPC .......... *H04W 48/18* (2013.01); *H04W 52/0216* (2013.01); *Y02B 60/50* (2013.01); *H04W 48/10* (2013.01); *H04W 36/14* (2013.01)
USPC ........ 455/436; 455/435.2; 455/450; 455/525; 455/509; 370/332; 370/333

(56) References Cited

U.S. PATENT DOCUMENTS

2004/0176024 A1* 9/2004 Hsu et al. ............... 455/3.04
2006/0268673 A1* 11/2006 Roh et al. ............... 370/203
2007/0041344 A1* 2/2007 Yaqub et al. ............ 370/331

FOREIGN PATENT DOCUMENTS

| | | |
|---|---|---|
| JP | H10-257549 | 9/1998 |
| JP | 2000-92541 | 3/2000 |
| JP | 2005-51568 | 2/2005 |
| WO | WO-00/30289 | 5/2000 |
| WO | WO-00/56089 | 9/2000 |

* cited by examiner

FIG. 3A  PARAMETER #1

|   | PARAMETER | MEANING OF PARAMETER |
|---|---|---|
| 1 | RECORD NUMBER | RECORD NUMBER OF HIGHER SYSTEM. NO HIGHER SYSTEM IN CASE OF 0 |

0 OR 1 OR MORE FOLLOWING RECORDS ARE CONTAINED.

|   | PARAMETER | MEANING OF PARAMETER |
|---|---|---|
| 1 | HIGHER SYSTEM BAND | BAND CLASS OF HIGHER SYSTEM |
| 2 | HIGHER SYSTEM FREQUENCY | FREQUENCY OF HIGHER SYSTEM |
| 3 | (HIGHER SYSTEM PN) | (PILOT PN SEQUENCE OFFSET INDEX OF HIGHER SYSTEM) |
| 4 | RESELECTION PERMITTED/NOT PERMITTED | JUDGMENT FLAG IF RESELECTION CAN BE EXECUTED |

FIG. 3B  PARAMETER #2

|   | PARAMETER | MEANING OF PARAMETER |
|---|---|---|
| 1 | RECORD NUMBER | RECORD NUMBER OF HIGHER SYSTEM. NO HIGHER SYSTEM IN CASE OF 0 |
| 2 | RESELECTION TIMER | TIME INTERVAL FOR EXECUTING RESELECTION |

0 OR 1 OR MORE FOLLOWING RECORDS ARE CONTAINED.

|   | PARAMETER | MEANING OF PARAMETER |
|---|---|---|
| 1 | HIGHER SYSTEM BAND | BAND CLASS OF HIGHER SYSTEM |
| 2 | HIGHER SYSTEM FREQUENCY | FREQUENCY OF HIGHER SYSTEM |
| 3 | (HIGHER SYSTEM PN) | (PILOT PN SEQUENCE OFFSET INDEX OF HIGHER SYSTEM) |
| 4 | RESELECTION PERMITTED/NOT PERMITTED | JUDGMENT FLAG IF RESELECTION CAN BE EXECUTED |

FIG. 3C  PARAMETER #3

|   | PARAMETER | MEANING OF PARAMETER |
|---|---|---|
| 1 | RECORD NUMBER | RECORD NUMBER OF HIGHER SYSTEM. NO HIGHER SYSTEM IN CASE OF 0 |

0 OR 1 OR MORE FOLLOWING RECORDS ARE CONTAINED.

|   | PARAMETER | MEANING OF PARAMETER |
|---|---|---|
| 1 | HIGHER SYSTEM BAND | BAND CLASS OF HIGHER SYSTEM |
| 2 | HIGHER SYSTEM FREQUENCY | FREQUENCY OF HIGHER SYSTEM |
| 3 | (HIGHER SYSTEM PN) | (PILOT PN SEQUENCE OFFSET INDEX OF HIGHER SYSTEM) |
| 4 | RESELECTION PERMITTED/NOT PERMITTED | JUDGMENT FLAG IF RESELECTION CAN BE EXECUTED |
| 5 | RESELECTION TIMER | TIME INTERVAL FOR EXECUTING RESELECTION |

MOBILE TERMINAL DEVICE, ITS COMMUNICATION METHOD, AND RADIO NETWORK SYSTEM

CROSS-REFERENCE TO RELATED APPLICATIONS

This application is a U.S. National Phase Application of International Application No. PCT/JP2008/056353 filed Mar. 31, 2008, which claims priority to Japanese Patent Application No. 2007-087831 filed Mar. 29, 2007 the disclosures of which are incorporated herein by reference in their entirety.

TECHNICAL FIELD

The present invention relates to a mobile terminal apparatus capable of standing while suitably switching among a plurality of communication systems, a wireless network system including a mobile terminal apparatus able to handle a plurality of base stations and a plurality of communication systems, and a wireless communication method.

BACKGROUND ART

In a mobile terminal apparatus connecting with a network through a base station, in order to maintain the quality of communication, it has been required to always select the base station best in signal state or traffic environment.

There is known a mobile terminal apparatus compatible a W-CDMA (Wideband-Code Division Multiple Access) for receiving information concerning neighbor cells from the base station of the cell at which the mobile terminal apparatus is currently standing by and detecting the cells according to a priority order contained in the neighbor cell information in order to acquire a neighbor cell at a high speed (see, for example, Patent Document 1).

Further there is known a cellular wireless system notifying information concerning a priority cell by an SMS (Short Message Service) as well (see, for example, Patent Document 2). In this way, there is known a method of reporting information concerning the neighbor base station from the base station in CDMA2000 1x as well.

Patent Document 1: Japanese Patent Publication (A) No. 2005-51568
Patent Document 2: Japanese Patent Publication (A) No. 10-257549

DISCLOSURE OF THE INVENTION

Problem to be Solved by the Invention

The present invention provides a mobile terminal apparatus capable of increasing the opportunities for standing by for a better communication system while reducing power consumption in order to realize a longer standby time and able to improve efficiency of the traffic, and a communication method of the same, and a wireless network system of the same.

Means for Solving the Problem

A mobile terminal apparatus of a first aspect of the present invention is a mobile terminal apparatus capable of standing by while switching among a plurality of communication systems, including: a communication part capable of selecting one of the plurality of communication systems and wirelessly communicating with the base station, and a control part changing the communication system used by the communication part and performing wireless communication, wherein the control part includes a broadcast information acquisition part using the communication part to periodically monitor for presence of a predetermined bit of a paging channel in the currently acquired base station, changing a reception time slot when existence of the bit can be confirmed, and obtaining the broadcast information reported by the paging channel as broadcast information acquisition processing, a system specifying part extracting a parameter containing information specifying communication systems existing among the neighbor from the broadcast information as neighbor communication system specifying processing, and a reselection processing part releasing a session of the currently acquired communication system and attempting acquisition with respect to the communication systems specified by the neighbor system specifying processing as reselection processing.

Further, in the mobile terminal apparatus according to the first aspect of the present invention, preferably each of the plurality of communication systems has a priority order, and the parameter does not contain information concerning the communication system having the lowest priority order.

Further, in the mobile terminal according to the first aspect of the present invention, preferably the parameter contains time information, and the control part is configured to make the reselection processing part start the reselection processing when a time designated by the time information passes after obtaining the parameter.

Further, in the mobile terminal apparatus according to the first aspect of the present invention, preferably the time information is added for each of the plurality of communication systems, and the control part is configured to make the reselection processing part execute the reselection processing for the communication system corresponding to the passed time after obtaining the parameter.

A mobile terminal apparatus according to a second aspect of the present invention is a mobile terminal apparatus capable of standing by while switching among a plurality of communication systems, including: a communication part capable of selecting one of the plurality of communication systems and wirelessly communicating with the base station and a control part changing the communication system used by the communication part and performing wireless communication, wherein the control part includes a broadcast information acquisition part using the communication part to periodically monitor for presence of a predetermined bit of a paging channel in the currently acquired base station, changing a reception time slot when existence of the bit can be confirmed, and obtaining the broadcast information in the paging channel as broadcast information acquisition processing, a system information acquisition part extracting a parameter containing information specifying whether or not a communication system different from the communication system reporting the broadcast information exists among the neighbor from the broadcast information as neighbor communication system information acquisition processing, and a reselection processing part releasing a session of the currently acquired communication system and attempting acquisition with respect to the communication systems different from the currently acquired communication system as reselection processing, and the reselection processing part executes the reselection processing when it is judged by the neighbor communication system information acquisition part that there is a communication system other than the currently acquired communication system and does not execute the reselection processing when it is judged that there is no communication system other than the currently acquired communication system.

Further, preferably, in the mobile terminal apparatuses according to the first and second aspects of the present invention, the plurality of communication systems have band classes or frequencies different from each other in a protocol used in the communication part.

A third aspect of the present invention is a communication method of a mobile terminal apparatus capable of standing by while switching among a plurality of communication systems, using at least one communication system among the plurality of communication systems to report a parameter containing information specifying other communication system among the neighbor as broadcast information by a predetermined time slot of a paging channel, and performing wireless communication with a base station sending a predetermined bit showing existence of broadcast information, including a monitor step of using the communication part to periodically monitor the presence of the predetermined bit in the paging channel in the currently acquired base station, a broadcast information acquisition step of changing the reception time slot to the predetermined time slot and obtaining the broadcast information when existence of the bit can be confirmed, a neighbor communication system specifying step of extracting the parameter from the broadcast information, and a reselection step of releasing the session of the currently acquired communication system and attempting acquisition for the communication systems specified by the neighbor system specifying processing.

A wireless network system of a fourth aspect of the present invention has a plurality of base stations and a mobile terminal apparatus able to handle a plurality of communication systems, wherein each base station reports uses at least one communication system among the plurality of communication systems to report a parameter containing information specifying the other communication systems among the neighbor as broadcast information by a predetermined time slot of a paging channel to the mobile terminal apparatus and transmits a predetermined bit showing existence of the broadcast information, the mobile terminal apparatus includes a communication part capable of using any of the plurality of communication systems to stand by for any of the plurality of base stations and capable of selecting one from among the plurality of communication systems to stand by for the base station and a control part changing the communication system used by the communication part and performing wireless communication, the control part executing broadcast information acquisition processing using the communication part to periodically monitor for presence of the predetermined bit in the paging channel in the base station waiting at present, changing the reception time slot to the predetermined time slot where existence of the bit can be confirmed, and obtaining the broadcast information, neighbor communication system specifying processing extracting the parameter from the broadcast information, and reselection processing releasing the session of the currently acquired communication system and attempting acquisition for the communication systems specified by the neighbor system specifying processing.

Effects of Invention

According to the present invention, it is possible to increase the opportunities for standing by for a better communication system while reducing power consumption for realizing a longer standby time and improve the traffic efficiency.

Further, unnecessary reselection can be suppressed, so poor reception can be reduced.

BRIEF DESCRIPTION OF THE DRAWINGS

FIG. 3A to FIG. 3C are diagrams showing an example of parameters set in a mobile terminal according to an embodiment of the present invention.

EXPLANATION OF NOTATIONS

1 . . . communication part, 2 . . . operation part, 3 . . . audio processing part, 6 . . . display part, 7 . . . memory part, 8 . . . control part, 10 . . . mobile phone, 20 . . . base station (base station apparatus), 30 . . . communication network, 40 . . . BSMS server, 81 . . . broadcast information acquisition part, 82 . . . neighbor communication system specifying part, 83 . . . reselection processing part, and 200 . . . database (DB).

BEST MODE FOR CARRYING OUT THE INVENTION

Note, recently, mobile terminal apparatuses capable of standing by at a plurality of frequency bands (communication systems) have been appearing.

Namely, mobile terminal apparatuses are also being required to select the base station best in signal state or traffic environment. It is proposed to change the acquired base station by performing hand-off using the neighbor base station information explained above.

"Hand-off" means the function of changing base stations (communication channels) and includes two types: hand-off not accompanied with a frequency change and hand-off accompanied with a frequency change. Hand-off not accompanied with a frequency change is hand-off performed without switching frequencies (for this reason, hand-off is not possible in a case where two base stations cannot provide service using the same frequency or the like), while hand-off accompanied with a frequency change is hand-off performing while switching frequencies while maintaining the session with the base station communicated with immediately before the switching of base stations.

Note that, in CDMA, there are different systems of a band class 3 (800 MHz band), a band class 6 (2 GHz band), and a band class 0 (new 800 MHz band). These differ not only in the frequency band, but also in the version of the protocol in many cases, therefore are called "systems". In the following explanation, these systems will be referred to as "communication systems".

However, in the case of hand-off not accompanied with a frequency change, the base stations are changed while maintaining the session, so cooperation between the acquired base station and the destination base station is necessary.

For this reason, the network side has to study the relationship of the base stations in advance from the stage of building the infrastructure. Accordingly, there are the problems of difficulty of support in regions where base stations are densely concentrate and regions where infrastructure is being built. It could not be said that complete support was possible.

Further, as Japanese specifications, an 800 MHz band (band class 3, present 800 MHz band) infrastructure has been set up. Traffic has become congested. Therefore, a newly allocated 800 MHz band (band class 0, new 800 MHz band) and a 2 GHz high frequency band (band class 6) infrastructures are being newly set up. In the case of such a tri-band compatible environment, only naturally the new frequency band would become more advantageous traffic wise. Therefore, it is desirably set with a higher degree of priority.

However, infrastructure-wise, the band class 3 is overwhelmingly stabler in coverage area. Therefore, once standing by at the frequency band of the band class 3, the communication terminal ends up operating without any problem at all by just a hand-off not accompanied with a frequency change in this frequency band, so unless there is an opportunity for the above explained hand-off not accompanied with a frequency change, the terminal will never be able to change to standby at the frequency band of the band class 6 or 0.

In order to avoid such the problem, the processing called "reselection" is known. "Reselection" means processing once releasing the standby state at a frequency in a state standing by at any frequency (session release), acquiring another frequency band having a higher degree of priority, and registering the position at that frequency band if the frequency band having a high degree of priority is nearby and thereby changing the waiting frequency band to the higher service quality frequency band.

On the other hand, as one of formats of reporting information from a base station to a terminal, there is a broadcast SMS. This is disclosed in Patent Literature 2 described above.

The reselection is usually performed in every predetermined cycle at a time interval counted by a reselection timer. In this case, the reselection processing will always occur whenever the timer completes the count, therefore useless power consumption will occur in an area where there is no higher service quality communication system defined by the PRL (Preferred Roaming List) nearby.

However, unless actually attempting the acquisition, it cannot be judged whether or not there is a higher communication system, therefore, to prolong battery life, the only option was to reduce the occasions of reselection.

Below, embodiments of the present invention will be explained with reference to the drawings.

Figure 1:
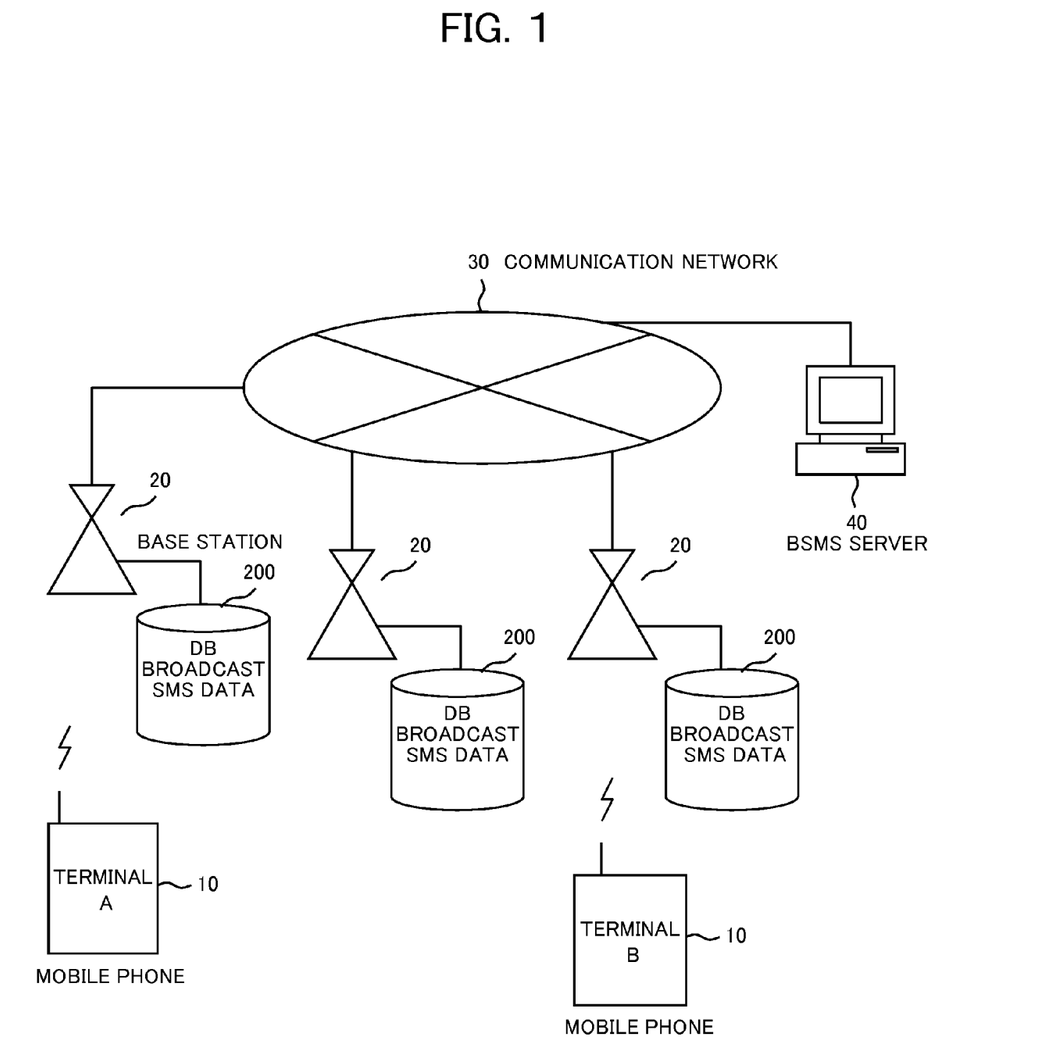
FIG. 1 is a diagram showing an example of the system configuration of a wireless network system according to an embodiment of the present invention.

FIG. 1 is a diagram showing an example of the system configuration of a wireless network system according to an embodiment of the present invention. Here, the wireless network system is constructed by applying known broadcast SMS technology.

In FIG. 1, a mobile phone 10 as a mobile terminal apparatus is connected with a network side apparatus (hereinafter, referred to as a "BSMS server 40") managed and run by a carrier through a communication network 30 including a base station (base station apparatus 20).

The base station apparatus 20 is provided with database (DB 200) holding broadcast information (SMS data) for individually reporting by broadcast SMS. Further, this DB 200 is rewritten by the BSMS server 40 through the communication network 30.

Here, paying attention to the fact that a user data parameter in a data burst message used in the broadcast SMS can be set at any value, it was decided to use this parameter to control the operation of the mobile phone 10.

The broadcast SMS contains a broadcast address in a message. All of the mobile phones 10 corresponding to this broadcast address can operate. For this reason, in a certain specific area, when a broadcast SMS containing a broadcast address is reported, a mobile phone 10 capable of recognizing the broadcast address can receive the broadcast SMS at a certain predetermined timing.

The broadcast SMS uses a data burst message and has a parameter (user data) which can be freely set by the user (here, a manager of the network). In the present embodiment, efficient reselection control is executed by this parameter setting. Details of acquisition of the parameter etc. will be explained later.

Specifically, the BSMS server 40 including the base station 20 uses one of a plurality of communication systems to report a parameter containing information specifying other neighbor communication systems as broadcast information in a predetermined time slot of the paging channel to the mobile phone 10 and transmits a predetermined bit showing existence of the broadcast information.

At this time, the mobile phone 10 periodically monitors for presence of the predetermined bit of the paging channel in the currently acquired base station, changes the time slot for synchronization (reception time slot) and obtains the broadcast information reported by the paging channel when existence of this bit can be confirmed. Then, the mobile phone executes reselection processing for extracting the parameter containing the information specifying communication systems existing among the neighbor from that broadcast information, releasing the session of the currently acquired communication system, and attempting acquisition with respect to the specified plurality of communication systems.

A detailed explanation will be given below.

Figure 2:
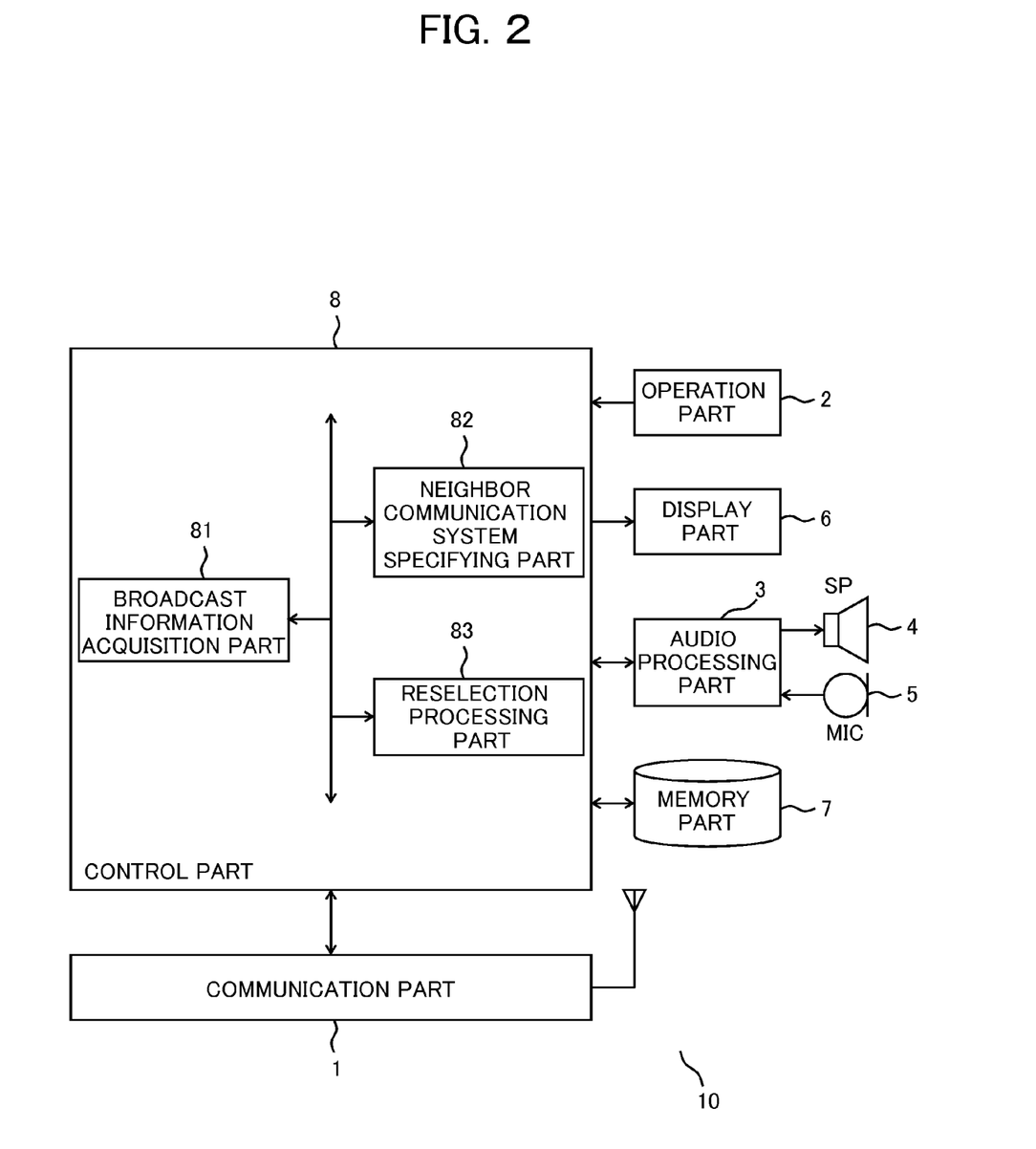
FIG. 2 is a block diagram showing an example of the configuration of a signal processing system of a mobile terminal according to an embodiment of the present invention.

FIG. 2 is a block diagram showing an example of the configuration of a signal processing system of the mobile terminal according to an embodiment of the present invention. Here, as the mobile terminal, a mobile phone 10 is exemplified.

As shown in FIG. 2, the mobile phone 10 is connected with a network side apparatus including a base station (base station 20 and BSMS server 40 shown in FIG. 1) through a communication network (30 in FIG. 1), can acquire a plurality of communication systems, and communicates according to a predetermined protocol by the communication system acquired with the network side apparatus.

The mobile phone 10 is configured by a communication part 1, operation part 2, audio processing part 3, speaker (SP) 4, microphone (MIC) 5, display part 6, memory part 7, and control part 8.

The communication part 1 acquires a plurality of communication systems and performs wireless communication with a not shown base station connected to the communication network according to the CDMA2000 1x or EVDO (Evolution-Data Optimized/only) communication protocol. Note that, EVDO communication is higher in communication speed than 1x communication. 1x communication, unlike tEVDO communication, has the feature of also supporting audio communication in addition to data communication.

The operation part 2 has, for example, a power key, a speak key, number keys, letter keys, direction keys, a decision key, a send key, and other keys to which various functions are assigned. When these keys are operated by the user, the operation part 2 generates signals corresponding to those operation contents and inputs these as an instruction of the user to the control part 8.

The audio processing part 3 performs the processing of the audio signal output from the speaker 4 and audio signal input at the microphone 5.

Namely, the audio processing part 3 amplifies audio input from the microphone 5, performs analog-to-digital conversion to convert it to digital audio data, and further applies encoding or other signal processing, and outputs the result to the control part 8.

Further, the audio processing part 3 applies decoding, digital-to-analog conversion, amplification, or other signal processing to the audio data supplied from the control part 8 to convert it to an analog audio signal and outputs the result to the speaker 4.

The display part 6 is configured by using, for example, a liquid crystal display panel, an organic EL (Electro-Luminescence) panel, or other display device and displays an image in accordance with a video signal supplied from the control part 8. For example, the display part 6 displays a phone number of a destination at the time of a send operation, a phone number of the other party at the time of reception, contents of received mail and transmitted mail, the date, time, remaining battery power, success of a transmission operation, a standby screen, and other various information and images.

The memory part 7 stores various types of data utilized for processing at the control part 8.

The memory part 7 holds, for example, programs provided in the control part 8, an address book for managing personal information such as phone numbers and e-mail addresses of other parties, an audio file for playing back an incoming call sound and an alarm sound, an image file for the standby screen, various types of setting data, temporary data utilized in the processing process of the programs, and so on.

The above memory part 7 is configured by, for example, a nonvolatile memory device (nonvolatile semiconductor memory, hard disc device, optical disc device, etc.), a random accessible memory device (for example, SRAM or DRAM), or the like.

The control part 8 centrally controls the entire operation of the mobile phone.

Namely, the control part 8 controls operations of blocks explained above (transmission/reception of signals at the communication part 1, input/output of audio at the audio processing part 3, display of an image in the display part 6, and so on) so that various types of processing of the mobile phone (speech carried out through a line exchange network, preparation and transmission/reception of e-mails, viewing of Internet Web (World Wide Web) sites, and so on) are executed in a suitable sequence in accordance with the operation of the operation part 2.

The control part 8 is provided with a computer (microprocessor) executing processing based on a program (operating system, application program etc.) stored in the memory part 7 and executes the processing explained above according to the sequence instructed in this program. Namely, the control part 8 sequentially reads command codes from the operating system, application program, or other program stored in the memory part 7 to execute the processing.

The control part 8 has a function of changing the communication system used by the communication part 1 and performing the wireless communication.

Specifically, the control part 8 has the following functions: Broadcast information acquisition processing using the communication part 1 to periodically monitor for presence of the predetermined bit of the paging channel in the currently acquired base station, changing the communication time slot when existence of the bit can be confirmed, and obtaining the broadcast information reported by the paging channel; neighbor communication system specifying processing extracting the parameter containing the information specifying communication systems existing among the neighbor from the broadcast information; and reselection processing releasing the session of the currently acquired communication system and attempting acquisition with respect to the communication systems specified by the neighbor system specifying processing.

Corresponding to this, the control part 8 is configured by, as shown functionally in FIG. 2, a broadcast information acquisition part 81, neighbor communication system specifying part 82, and reselection processing part 83.

Further, although not particularly explained in detail, the control part 8 includes also a function of performing processing for registering the position using the successfully acquired communication system and standing by at the reselected base station.

The broadcast information acquisition part 81 has a function of performing broadcast information acquisition processing using the communication part 1 to periodically monitor for presence of the predetermined bit of the paging channel in the currently acquired base station and changing the communication time slot and acquiring the broadcast information reported by the paging channel when existence of this bit can be confirmed.

Further, the neighbor communication system specifying part 82 has a function of performing neighbor communication system specifying processing extracting the parameter containing the information specifying the communication systems existing among the neighbor from the broadcast information.

Further, the reselection processing part 83 has a function of performing reselection processing releasing a session of the currently acquired communication system and attempting acquisition with respect to the communication systems specified by the neighbor system specifying processing.

Figure 3A:
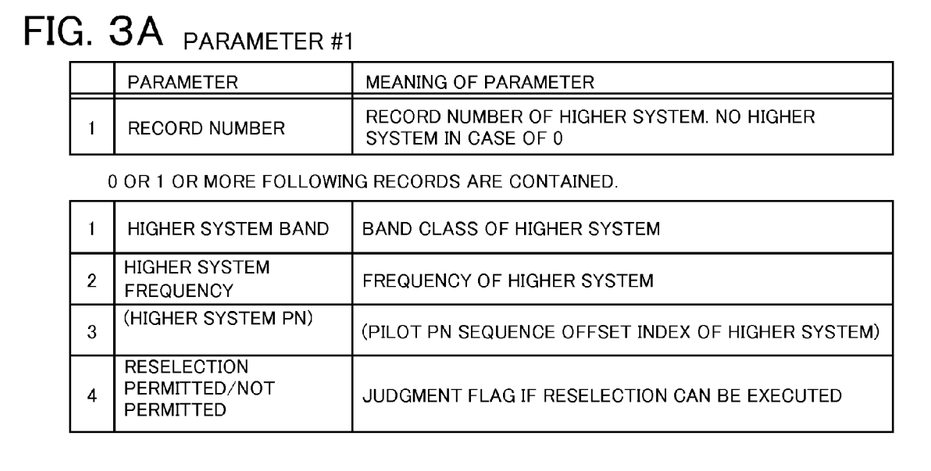
Figure 3B:
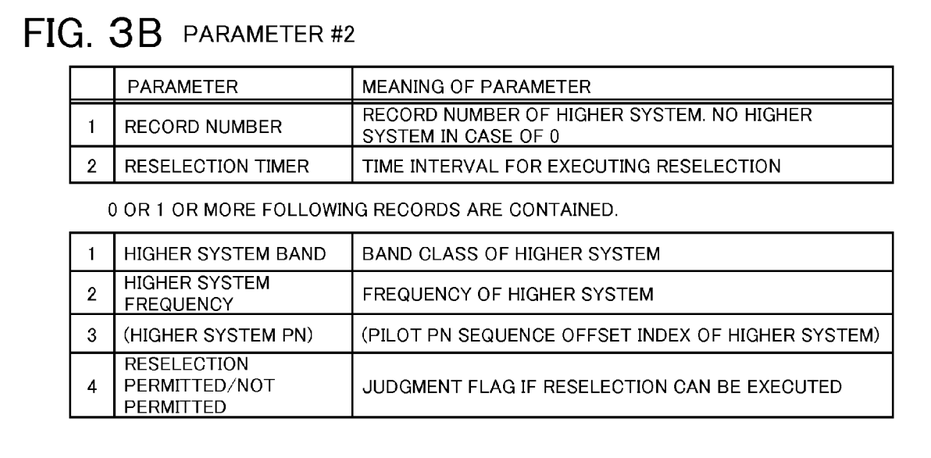
Figure 3C:
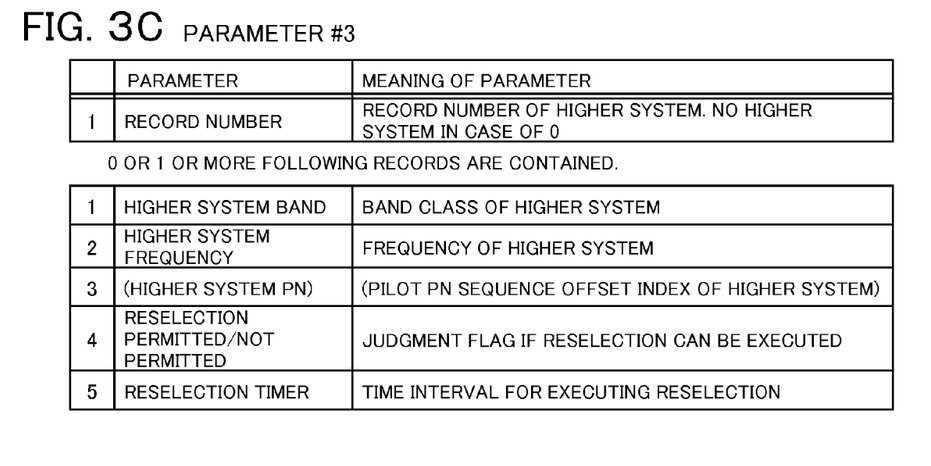

FIG. 3A to FIG. 3C are diagrams showing an examples of setting the parameters #1 to #3. Below, the operation of the mobile terminal apparatus shown in FIG. 2 will be explained in detail for each of these parameters (#1 to #3).

[Parameter #1]

The parameter #1 shown in FIG. 3A is formed by a record number of higher communication systems and is configured containing the band class of 0, 1, or more higher communication systems, the frequency of the higher communication system, the PN code of the higher communication system, and a "reselection permitted/not permitted" flag showing whether or not reselection of a record destination of a reselectable higher communication system is possible. Note that, the case where the record number is 0 indicates that there is no higher service quality communication system.

When the parameter #1 contains one or more records, by setting the highest order from the communication system having the highest degree of priority, the mobile phone 10 can perform the reselection processing in the order of reception. For this reason, the mobile phone 10 judges the "reselection permitted/not permitted" flag simultaneously with the reception. In the case of yes, it can immediately start the reselection operation by utilizing the record information.

The base station 20 can inhibit (restrict) the reselection operation by setting the "reselection permitted/not permitted" flag to "not permitted" so as not to execute the reselection processing as well.

Figure 4:
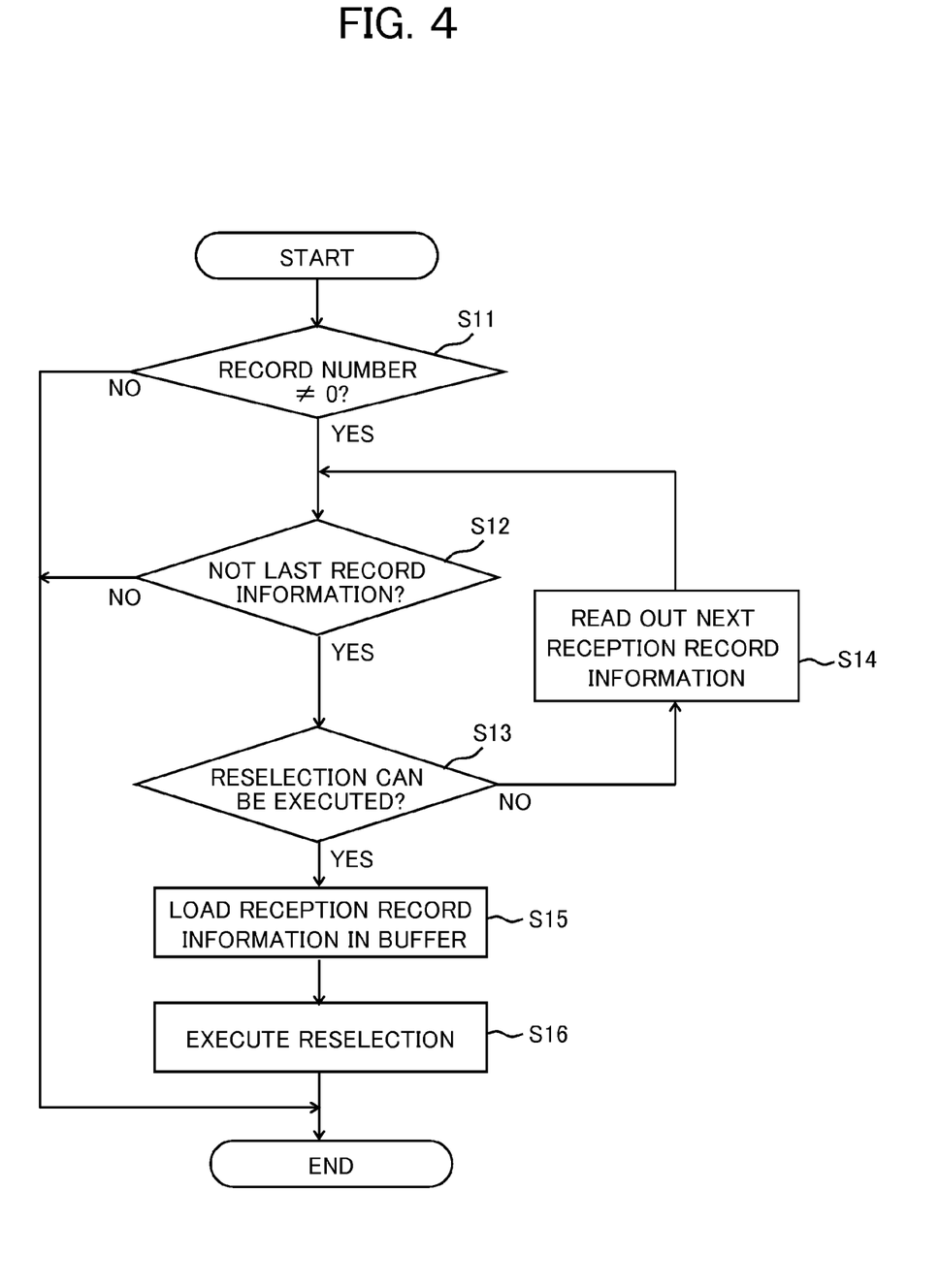
FIG. 4 is a flow chart showing an operation (parameter #1) of a mobile terminal according to an embodiment of the present invention.

FIG. 4 shows the operation of the control part 8 of the mobile phone 10 as a flow chart.

The control part 8 (reselection processing part 83) acquires the broadcast information by the broadcast information acquisition part 81 and operates as follows based on the parameter containing information specifying the communication systems existing among the neighbor (parameter #1) which is extracted by the neighbor communication system specifying part 82 from the broadcast information.

The reselection processing part 83 first judges whether or not the "record number" of the received parameter is 0 (step S11). Here, in the case of 0 (step S11 "No"), the reselection processing part recognizes that a higher service quality communication system is not included and does not execute the reselection. Conversely, when there is no reception record information (step S12 "No") or it disappears, the reselection processing part ends the processing without executing the reselection.

On the other hand, when the reception record still remains (step S12 "Yes"), the "reselection permitted/not permitted" flag is referred to (step S13). Conversely, in the case of "not permitted" (step S13 "No"), that record information is not used, but the next record information is read out (step S44). In the case of "permitted", a reselectable record is included (step S13 "Yes"), so the reselection processing part 83 loads (copies) the reception record (band class, frequency, PN, reselection permitted/not permitted) in a not shown built-in buffer. Then, the reselection processing part executes the reselection processing by using the information contained in that record (step S16).

According to the mobile terminal apparatus according to the embodiment of the present invention described above, the reselection processing can be executed without a scan processing, therefore the effect that the reselection processing speed can be raised is exhibited.

[Parameter #2]

The parameter #2 is one, as shown in FIG. 3B, obtained by adding the "reselection timer" parameter showing the time interval of executing the reselection to the parameter #1 shown in FIG. 3A.

Due to this, unlike the parameter setting #1, the timer value up to the activation of reselection can be freely set, and the reselection can be caused at the timing desired by the base station 20.

Further, if the "reselection timer" is added to the record, it is also possible to freely set the reselection time for each of the higher communication systems.

Figure 5A:
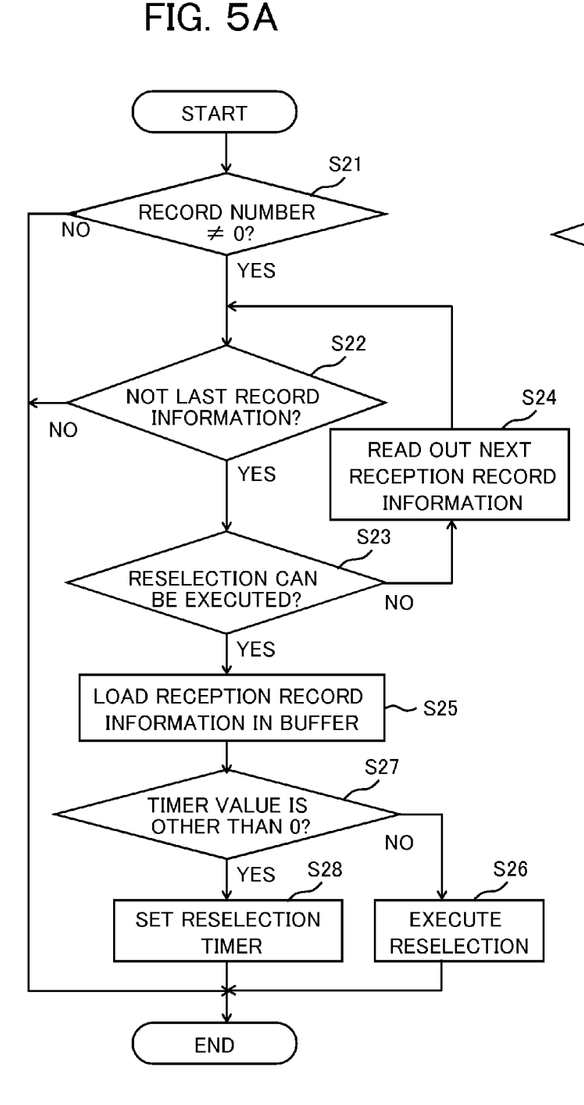
FIG. 5A and FIG. 5B are flow charts showing an operation (parameter #2) of a mobile terminal according to an embodiment of the present invention.
Figure 5B:
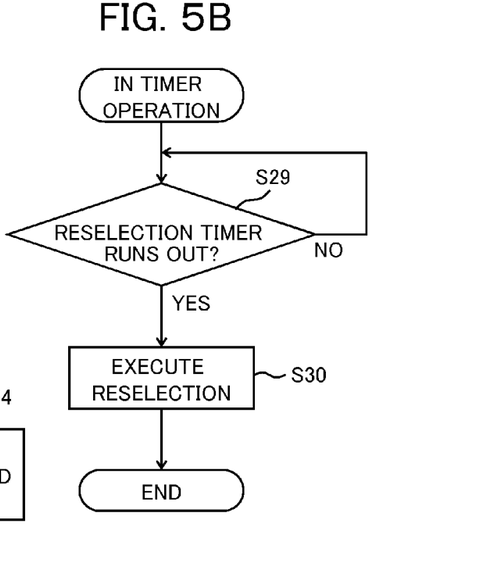

FIG. 5A and FIG. 5B show operations of the control part 8 of the mobile phone 10 as flow charts. FIG. 5A shows a basic operation, and FIG. 5B shows a timer monitor operation.

The control part 8 (reselection processing part 83) acquires the broadcast information by the broadcast information acquisition part 81 and operates as follows based on the parameter (parameter #2) containing the information specifying the communication systems existing among the neighbor which is extracted by the neighbor communication system specifying part 82 from the broadcast information.

The processing of steps S21 to S24 is the same as the case of [Parameter #1] explained before, therefore the explanation is omitted here in the sense of avoiding overlap (S21 corresponds to S11, S22 corresponds to S12, S23 corresponds to S13, and S24 corresponds to S14).

However, when it is judged that the record number is 0 in the record number judgment processing of step S21 (S21 "No"), if the reselection timer is operating by the previously received record information, it is recognized that there is no longer any communication system to be reselected, the reselection timer is stopped, and reselection is not executed.

On the other hand, the value of the "reselection timer" is judged at step S27. However, here, the reselection processing part 83 sets the value in the reselection timer and activates the timer (S28) in a case where the value of the reselection timer is other than 0 (step S27 "Yes").

The reselection processing part 83 quickly performs the reselection processing when the timer value is 0 (step S27 "No") (step S26).

During the operation of the reselection timer, it is judged if the time has run out as shown in FIG. 5B (S29). Then, if the time has run out (S29 "Yes"), the reselection processing is executed from the upper communication system by using the reception record information (step S30).

[Parameter #3]

The parameter #3 explained below is one obtained by adding the "reselection timer" parameter to the parameter #1 for each record.

The operation is substantially the same as the operations of the parameter #2 shown in FIG. 5A and FIG. 5B.

In the case of the parameter #2, when the reselection timer runs out of time (S29 "Yes"), the reselection operation is executed for all communication systems for which reselection is "permitted" by the reception record information. Note that, naturally, the priority order is given in order of reception, therefore the reselection processing is started from the upper communication system.

As opposed to this, in the case of the parameter #3, the reselection timer value can be freely set for each communication system. Therefore, for example, when the reselection timer value of the communication system having a higher priority order is larger, a communication system having a lower priority order can be reselected. In this way, the effect that the choices on the base station side can be expanded is exhibited, and the reselection operation can be controlled for each communication system.

Figure 6:
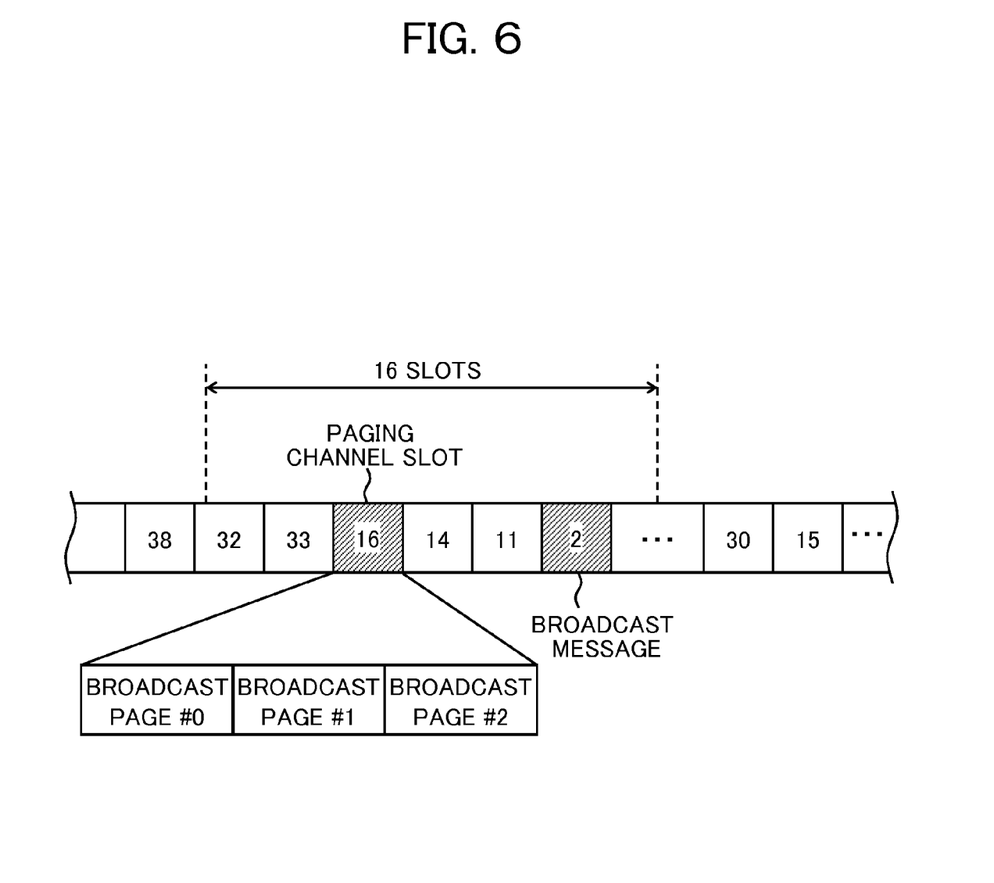
FIG. 6 is a diagram showing allocation of time slots used in a wireless network according to an embodiment of the present invention.

FIG. 6 is a diagram shown in the sense of supplementing the explanation of the operation of the broadcast information acquisition part 81 of the control part 8.

In the embodiment of the present invention, the wireless network system was constructed by applying the broadcast SMS technique. For this reason, the broadcast information is obtained according to the following rules.

Namely, as shown in FIG. 6, the broadcast information (broadcast message) is transmitted in units of 16 continuous slots in a time sequence. Then, the mobile phone 10 configured to receive this broadcast information periodically (one time per 16 times) monitors the paging channel assigned to the specific time slot.

Specifically, the broadcast information acquisition part 81 waits for the broadcast information at, for example, a time slot 2 which is assigned for each mobile terminal apparatus and periodically monitors that slot.

If the predetermined bit of the paging channel in the currently acquired base station has become ON at a certain timing, the slot is changed and referred to (for example, following slot 5). Then, the broadcast information reported using this referred to slot of the paging channel is obtained and transferred to the neighbor communication system specifying part 82.

Note that, for the referred to change slot etc., a predetermined computation equation using a hash function is prescribed in the rules.

As explained above, according to the embodiment of the present invention, the mobile terminal apparatus and the network system which reliably perform the reselection processing while reducing the power consumption in order to realize a longer standby time to increase the opportunities for standing by at the higher communication system and capable of improving the traffic efficiency can be provided.

Further, no major modifications are required at the network side apparatuses (base station 20 and BSMS server 40), so the infrastructure can be quickly built. Namely, when changing the infrastructure environment around a certain base station 20, by just changing the parameter of the database (DB) 200 of this base station 20, reselection can be supported even in the new infrastructure even without making any changes at the mobile terminal side.

Further, the parameter can be changed remotely from the BSMS server 40 as well. The load of the work is small, therefore the costs can be kept low as well.

Further, when the broadcast SMS is utilized, only a mobile terminal apparatus having the broadcast address acquires the report bit containing the broadcast SMS of the paging channel, therefore a non-compatible mobile terminal apparatus does not perform any special operation. Accordingly, there is no adverse influence upon the non-compatible mobile terminal apparatus. Then, even when there is no special countermeasure at the network side apparatus, co-existence of a scheme using the reselection timer as in the conventional case and a reselection scheme using broadcast information is possible.

Note that, the reselection processing part 83 controls the reselection processing to be executed when the neighbor communication system specifying part 82 judges that there is a communication system other than the currently acquired communication system. Further, the reselection processing part controls the reselection processing to not be executed in the case of judgment that there is no communication system other than the currently acquired communication system. Due to this, the reselection can be efficiently inhibited, and accordingly power is saved and poor transmission/reception can be avoided.

Further, according to the wireless network system according to the embodiment of the present invention, the neighbor cell information is obtained from the base station 20 by using the broadcast SMS. The broadcast SMS can limit the supported mobile phones 10 and can be transmitted to a small sized range, for example, the unit of base stations or unit of cells, therefore the base station 20 can efficiently transmit the cell information to the mobile phone 10. Due to this, the mobile phone 10 can easily obtain the neighbor cell information, can understand there is no need to perform the reselection processing when the environment is not a multi-band one, and can continue waiting at the band class at which it is waiting at present.

Further, the base station 20 can freely change the reselection timing, therefore the control of the mobile terminal can be easily carried out. From the above, it becomes unnecessary for the mobile terminal apparatus to execute unnecessary reselection processing, therefore the idle current can be reduced and poor transmission/reception can be efficiently suppressed.

Note that, according to the above embodiment of the present invention described above, the invention can be applied to all mobile terminal apparatuses compatible with not only CDMA2000 but the W-CDMA and GSM/UMTS (Universal Mobile Telecommunication System/Global System for Communications). Further, the mobile phone 10 was exemplified as a mobile terminal apparatus, but the invention is not limited to the mobile phone 10 and may be applied to a PDA (Personal Digital Assistants), game machine, etc. in the same way.

Further, the functions of the blocks of the mobile terminal apparatus according to the embodiment of the present invention may all be realized by software or a portion thereof may be realized by hardware. For example, the data processing in the broadcast information acquisition part 81, neighbor communication system specifying part 82, and reselection processing part 83 which configure the control part 8 may be realized by one or more programs on the computer or at least a portion thereof may be realized by hardware.

The invention claimed is:

1. A mobile terminal apparatus configured to stand by while switching among a plurality of communication systems, comprising:
    a communication part configured to select one of the plurality of communication systems and wirelessly communicate with a currently acquired base station; and
    a control part configured to change a currently selected communication system used by the communication part and perform wireless communication with a newly selected one of the plurality of communication systems, wherein
    the control part comprising:
    a broadcast information acquisition part configured to use the communication part to periodically monitor for presence of a predetermined bit of a paging channel used by the currently acquired base station, and when the predetermined bit is present, changing a reception time slot of the paging channel to obtain the broadcast information reported by the paging channel;
    a system specifying part configured to extract a parameter containing information specifying neighbor communication systems from the broadcast information; and
    a reselection processing part configured to release a session of the currently selected communication system and acquire a new session with respect to the newly selected communication system specified by the system specifying part.

2. The mobile terminal apparatus as set forth in claim 1, wherein
    each of the plurality of communication systems has a priority order, and
    the parameter does not contain information concerning the communication system having the lowest priority order.

3. The mobile terminal apparatus as set forth in claim 1, wherein
    the parameter contains time information, and
    the control part is configured to make the reselection processing part start the reselection processing when a time designated by the time information passes after obtaining the parameter.

4. The mobile terminal apparatus as set forth in claim 3, wherein
    the time information is added for each of the plurality of communication systems, and
    the control part is configured to make the reselection processing part execute the reselection processing for the communication system corresponding to the passed time after obtaining the parameter.

5. The mobile terminal apparatus as set forth in claim 1, wherein the plurality of communication systems have band classes or frequencies different from each other in a protocol used in the communication part.

6. The mobile terminal apparatus as set forth in claim 1, wherein if the predetermined bit is not present, no further acquisition and reselection processing is performed.

7. A mobile terminal apparatus configured to stand by while switching among a plurality of communication systems, comprising:
- a communication part configured to select one of the plurality of communication systems and wirelessly communicate with a currently acquired base station; and
- a control part configured to change a currently selected communication system used by the communication part and perform wireless communication with a newly selected communication system, wherein the control part includes:
- a broadcast information acquisition part configured to use the communication part to periodically monitor for presence of a predetermined bit of a paging channel used by the currently acquired base station, and when the predetermined bit is present, changing a reception time slot to obtain the broadcast information in the paging channel;
- a system information acquisition part configured to extract a parameter containing information specifying whether or not a new communication system different from a currently selected communication system reporting the broadcast information exists from the broadcast information; and
- a reselection processing part configured to release a session of the currently selected communication system and acquire a new session with respect to the newly selected communication system different from the currently selected communication system; and
- the reselection processing part executes the reselection processing when it is judged by the system information acquisition part that there is a communication system other than the currently selected communication system and does not execute the reselection processing when it is judged that there is no communication system other than the currently selected communication system.

8. The mobile terminal apparatus as set forth in claim 7, wherein the plurality of communication systems have band classes or frequencies different from each other in a protocol used in the communication part.

9. A communication method of a mobile terminal apparatus configured to stand by while switching among a plurality of communication systems and performing wireless communication with a currently acquired base station, using at least one communication system among the plurality of communication systems to report a parameter containing information specifying another communication system among neighbor communication systems as broadcast information by a predetermined time slot of a paging channel, and sending a predetermined bit showing existence of broadcast information, the method comprising:
- a monitoring step of using a communication part to periodically monitor a presence of the predetermined bit in the paging channel used by the currently acquired base station, and when the predetermined bit is present, performing further acquisition and reselection processing, comprising:
- a broadcast information acquisition step of changing a reception time slot of the paging channel to the predetermined time slot and obtaining the broadcast information;
- a neighbor communication system specifying step of extracting the parameter from the broadcast information; and
- a reselection step of releasing a session of a currently selected communication system and acquiring a new session using a new communication system specified by the neighbor communication system specifying step.

10. A wireless network system having:
- a plurality of base stations; and
- a mobile terminal apparatus configured to handle a plurality of communication systems, wherein each base station uses at least one communication system among the plurality of communication systems to report a parameter containing information specifying neighbor communication systems among the plurality of communication systems as broadcast information by a predetermined time slot of a paging channel to the mobile terminal and transmits a predetermined bit showing existence of the broadcast information wherein:

the mobile terminal apparatus includes a communication part configured to use any of the plurality of communication systems to stand by for any of the plurality of base stations and select one from among the plurality of communication systems to stand by for the base station, and a control part configured to change a currently selected communication system used by the communication part and perform wireless communication with a newly selected communication system;

the control part configured to execute:
broadcast information acquisition processing using the communication part to periodically monitor for presence of the predetermined bit in the paging channel used by the base station waiting at present, and when the predetermined bit is present, changing the reception time slot of the paging channel to the predetermined time slot to obtain the broadcast information;
neighbor communication system specifying processing extracting the parameter from the broadcast information; and
reselection processing releasing a session of the currently selected communication system and acquiring a new session using the newly selected communication system specified by the neighbor system specifying processing.

* * * * *